G. A. LUTZ.
FLEXIBLE CONDUIT.
APPLICATION FILED JUNE 6, 1908.
962,772.
Patented June 28, 1910.
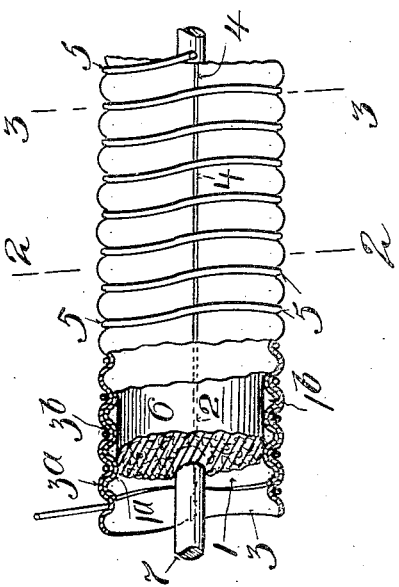
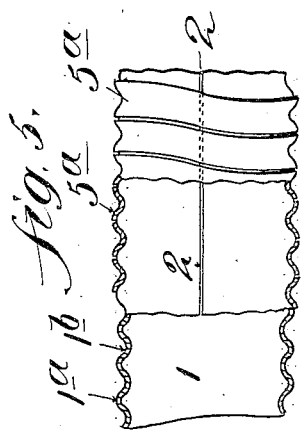
Witnesses:
Inventor
George A. Lutz
By his Attorney
D. F. Bourne

UNITED STATES PATENT OFFICE.

GEORGE A. LUTZ, OF PLAINFIELD, NEW JERSEY, ASSIGNOR TO AMERICAN CIRCUL LOOM COMPANY, OF PORTLAND, MAINE, A CORPORATION OF MAINE.

FLEXIBLE CONDUIT.

962,772.     Specification of Letters Patent.     Patented June 28, 1910.

Application filed June 6, 1908. Serial No. 437,116.

*To all whom it may concern:*

Be it known that I, GEORGE A. LUTZ, a citizen of the United States, and resident of Plainfield, in the county of Union and State of New Jersey, have invented certain new and useful Improvements in Flexible Conduits, of which the following is a specification.

The object of my invention is to produce a flexible conduit, tube, or protecting covering for electric conductors, and other purposes, which may be applied directly upon an insulated conductor during the process of forming the conduit or protector, or the conductor may be drawn into the conduit or tube after the latter is made.

In carrying out my invention I provide a strip of suitable flexible material, such as steel, or the like, and corrugate the same transversely, the corrugations preferably passing across the strip at an oblique angle to the longitudinal axis of the strip, and such corrugated strip is bent into tubular or other suitable hollow form, and to hold the same in such hollow or tubular form I provide a binder encircling the same, such as a wire or strip wound around the tube. With the corrugations formed in the strip at an angle to the longitudinal axis of the latter, and the latter bent into tubular form with its edges abutting, the corrugations of the tube so formed will extend along the tube in a spiral direction, and thus the binder may be wound spirally in the grooves or on the projections of the tube. The interior of the conduit or tube formed as above described will be substantially smooth throughout without sharp edges or corners liable to injure the insulation of the conductor when the latter is drawn through the tube.

Reference is to be had to the accompanying drawings forming part hereof, wherein, Figure 1 is a partly broken side view of a flexible conduit or tube constructed in accordance with my improvements, shown containing an insulated conductor, Fig. 2 is a cross section on the line 2, 2, in Fig. 1, the conductor being removed, Fig. 3 is a similar view on the line 3, 3, in Fig. 1, showing the conductor, Fig. 4 is a detail view illustrating the manner of forming the conduit, and Fig. 5 is a side view partly broken of a modification.

In carrying out my invenion I take a strip $a$ of suitable metal, such as steel, and corrugate the same transversely, preferably at an oblique angle to the longitudinal axis of the strip, and roll or bend such corrugated strip into tubular or hollow form, as shown in dotted lines in Fig. 4, so that the edges of the tubular strip preferably abut. The corresponding projections $1^a$ and depressions $1^b$ of the tube 1 thus formed meet in such manner as to provide spiral projections and depressions around the tube, and the inner surface of the tube is substantially smooth.

To close and protect the joint 2 between the longitudinal meeting edges I have shown in Figs. 1, 2 and 3 an outer tubular covering 3 made in manner similar to that described with respect to tube 1, and fitting closely over the latter, with the corresponding projections and depressions $3^a$, $3^b$, alining with the corresponding projections and depressions $1^a$, $1^b$, but the joint 4 is out of line with the joint 2 of the inner tube, and preferably on the side of the tube or conduit opposite joint 2, as shown in Fig. 2.

To hold the outer tube or protector 3 upon the inner tube 1 I have shown a binder 5, in the form of a wire, wound spirally around the tube or conduit and entering the depressions $3^b$.

The conduit or protecting tube described may be formed directly upon the insulation 6 of conductor 7, or the flexible tube or conduit may be made independently and the conductor subsequently drawn in the same as desired.

Instead of providing the outer flexible tubular cover 3 as above described whereby the flexible tube or conduit is of substantially two thicknesses of metal, I may provide the tube in a single corrugated strip, in which case while the binder 5 in the form of a wire may be used as before described, I preferably provide the binder in the form of a strip of metal $5^a$, as shown in Fig. 5, which may be bent into shape corresponding to the corrugations of tube 1, to lie in the depressions and upon the projecting portions thereof, which strip will substantially close the joint 2 of tube 1, as by having the edges of strip $5^a$ abutting. The spirally disposed binder $5^a$ will be flexible to bend as required.

The tube, conduit or protecting covering constructed in accordance with my invention will be flexible to enable the same bend around corners, and one of the advantages of my invention is that such tube, conduit or protector may be made of indefinite lengths so as to avoid the use of couplings between adjacent tubes or conduits as much as possible. Furthermore, by making the tube or conduit, or the inner portion thereof of a single strip of material there will be but the single joint 2 exposed to the contained conductor, with such joint protected as set forth, as distinguished from the well known flexible conduits made from one or more strips spirally wound and interlocking with each other near their edges.

Having now described my invention what I claim is:

1. A flexible tube comprising inner and outer strips bent into tubular form around their longitudinal axes and having corrugations, the joint of one strip being out of line with the joint of the other strip.

2. A flexible tube comprising inner and outer strips bent into tubular form around their longitudinal axes and having corrugations, the joint of one strip being out of line with the joint of the other strip, and a binder encircling the outer strip.

3. The combination of an insulated conductor, with a protecting covering comprising a strip bent around its longitudinal axis and surrounding the insulation and provided with corrugations extending around the strip, an outer longitudinally disposed strip provided with corrugations, the longitudinal joints of said strips being out of alinement, and means to retain said strips upon said conductor.

4. A flexible tube comprising a metal strip of greater length than width having corrugations at an angle to its longitudinal axis and bent in tubular form, and an outer metal tube having corrugations bent around the first named tube, the joints of said tubes being out of line.

5. A flexible tube comprising inner and outer strips having corresponding corrugations, said strips being bent into tubular form around their respective longitudinal axes, the corrugations of one strip matching the corrugations of the other strip, the joint at the longitudinal edges of one strip breaking joint with the longitudinal edges of the other strip.

Signed at New York city, in the county of New York, and State of New York, this 27th day of May, A. D. 1908.

GEORGE A. LUTZ.

Witnesses:
T. F. BOURNE,
MARIE F. WAINRIGHT.